(12) United States Patent  
Baldwin

(10) Patent No.: US 9,039,044 B1
(45) Date of Patent: May 26, 2015

(54) STANDOFF RING AND SAFETY CAGE FOR PROCESS PIPE

(71) Applicant: James E. Baldwin, Houston, TX (US)

(72) Inventor: James E. Baldwin, Houston, TX (US)

( * ) Notice: Subject to any disclaimer, the term of this patent is extended or adjusted under 35 U.S.C. 154(b) by 0 days.

(21) Appl. No.: 14/180,313

(22) Filed: Feb. 13, 2014

(51) Int. Cl.
*F16L 57/00* (2006.01)
*F16L 3/12* (2006.01)

(52) U.S. Cl.
CPC ... *F16L 3/12* (2013.01); *F16L 57/00* (2013.01)

(58) Field of Classification Search
CPC ........... F16L 35/00; F16L 57/00; F16L 57/04; F16L 57/06
USPC ........... 285/45, 46, 123.4, 411; 138/110, 112, 138/113; 165/157, 158; 432/225, 226
See application file for complete search history.

(56) References Cited

U.S. PATENT DOCUMENTS

| | | | | |
|---|---|---|---|---|
| 904,870 | A * | 11/1908 | Heidecke et al. | 285/45 |
| 1,677,077 | A * | 7/1928 | Fortune | 138/110 |
| 2,127,694 | A * | 8/1938 | Miller | 285/50 |
| 2,178,819 | A * | 11/1939 | Timm | 285/411 |
| 2,410,753 | A * | 11/1946 | Shinomiya | 138/110 |
| RE23,545 | E * | 9/1952 | Bond | 138/113 |
| 2,735,449 | A * | 2/1956 | Phelps, Jr. | 138/113 |
| 2,748,803 | A * | 6/1956 | Guarnaschelli | 138/110 |
| 2,748,804 | A * | 6/1956 | Guarnaschelli | 138/110 |
| 2,750,963 | A * | 6/1956 | Bond | 138/113 |
| 2,782,804 | A * | 2/1957 | Bond | 138/113 |
| 2,804,095 | A * | 8/1957 | Schauenburg | 138/107 |
| 2,962,051 | A * | 11/1960 | Burkes, Jr. | 285/47 |
| 3,600,770 | A * | 8/1971 | Halling | 285/411 |
| 3,661,409 | A * | 5/1972 | Brown et al. | 285/367 |
| 3,797,079 | A * | 3/1974 | Nixon | 285/411 |
| 3,889,715 | A * | 6/1975 | Lilja et al. | 138/117 |
| 4,603,737 | A * | 8/1986 | Spikes | 166/241.7 |
| 4,885,122 | A * | 12/1989 | Stapleton | 285/411 |
| 4,962,826 | A * | 10/1990 | House | 181/207 |
| 5,303,744 | A * | 4/1994 | Eriksson | 138/110 |
| 5,402,830 | A * | 4/1995 | Dortzbach | 138/110 |
| 5,441,082 | A * | 8/1995 | Eskew et al. | 138/112 |
| 5,499,849 | A * | 3/1996 | Fend | 285/411 |
| 5,592,975 | A * | 1/1997 | Wissmann et al. | 138/112 |
| 5,645,303 | A * | 7/1997 | Warehime et al. | 285/411 |
| 5,967,564 | A * | 10/1999 | Gaucherot | 285/411 |
| 6,158,475 | A * | 12/2000 | Clemmer | 138/112 |
| 6,298,883 | B1 * | 10/2001 | Kinzel | 138/108 |
| 6,499,774 | B1 * | 12/2002 | Smith | 285/411 |
| 6,571,832 | B1 * | 6/2003 | Elliott | 138/108 |
| 6,736,166 | B2 * | 5/2004 | Calais et al. | 138/112 |
| 6,846,176 | B2 * | 1/2005 | Brown et al. | 432/226 |
| 6,896,004 | B1 * | 5/2005 | Witzel | 138/112 |
| 7,225,837 | B1 * | 6/2007 | Kane | 138/112 |
| 7,828,340 | B2 * | 11/2010 | Heelan et al. | 285/411 |
| 8,657,255 | B2 * | 2/2014 | Goodman et al. | 285/411 |
| 2014/0090736 | A1 * | 4/2014 | Petersen et al. | 138/103 |

* cited by examiner

*Primary Examiner* — David E Bochna
(74) *Attorney, Agent, or Firm* — Buskop Law Group, PC; Wendy Buskop

(57) ABSTRACT

A standoff ring for a process pipe having either a plurality of single ring plates, or a plurality of alternativing single ring plates with a plurality of double plate ring plates to form the standoff ring. A plurality of fasteners secured through fastener holes in the plates to connect the plates together. A masterlink is used to adjust the plates to various diameters of the process pipe. A safety cage can be connected to or over the standoff ring encircling the process pipe.

13 Claims, 9 Drawing Sheets

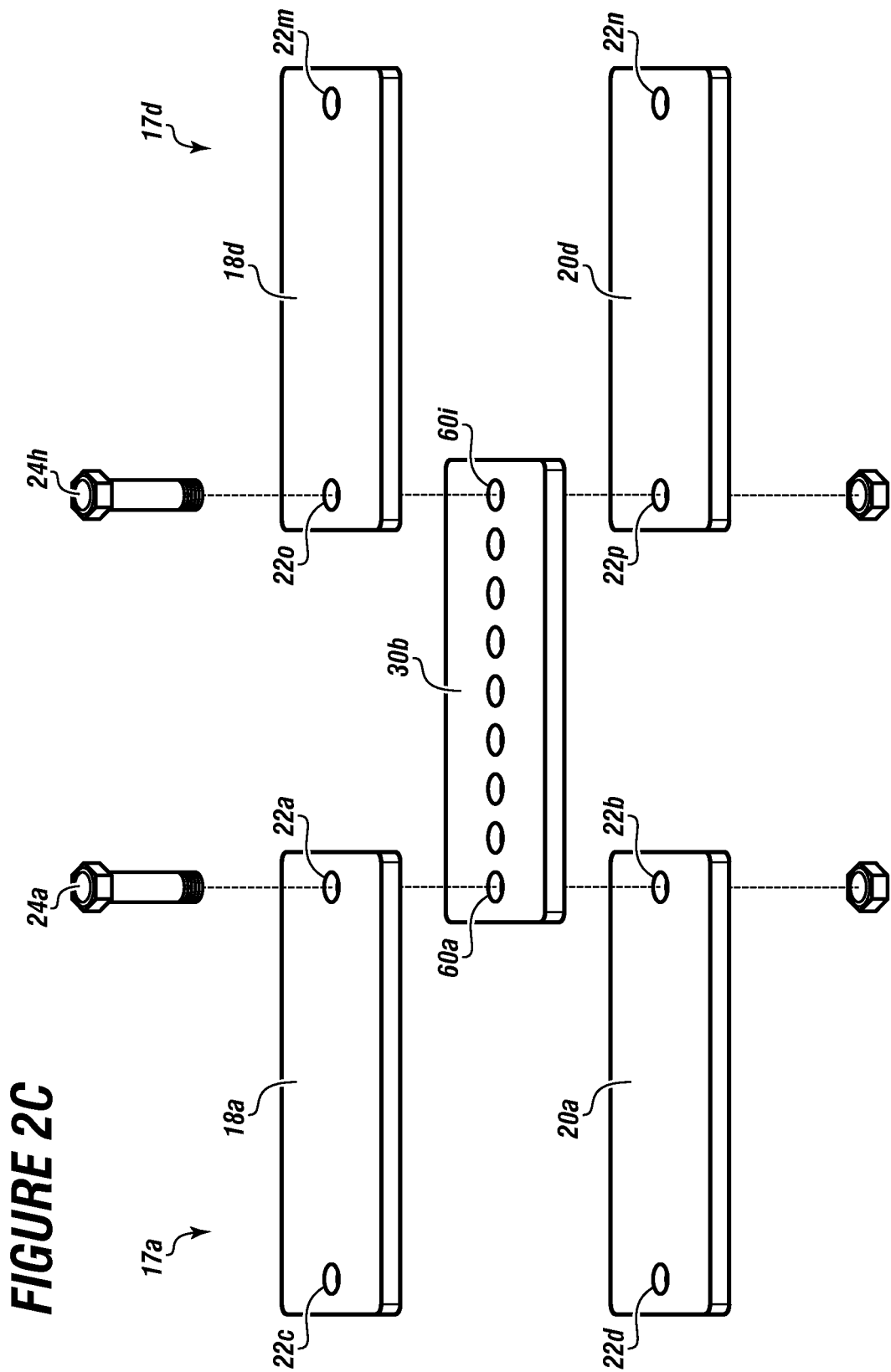

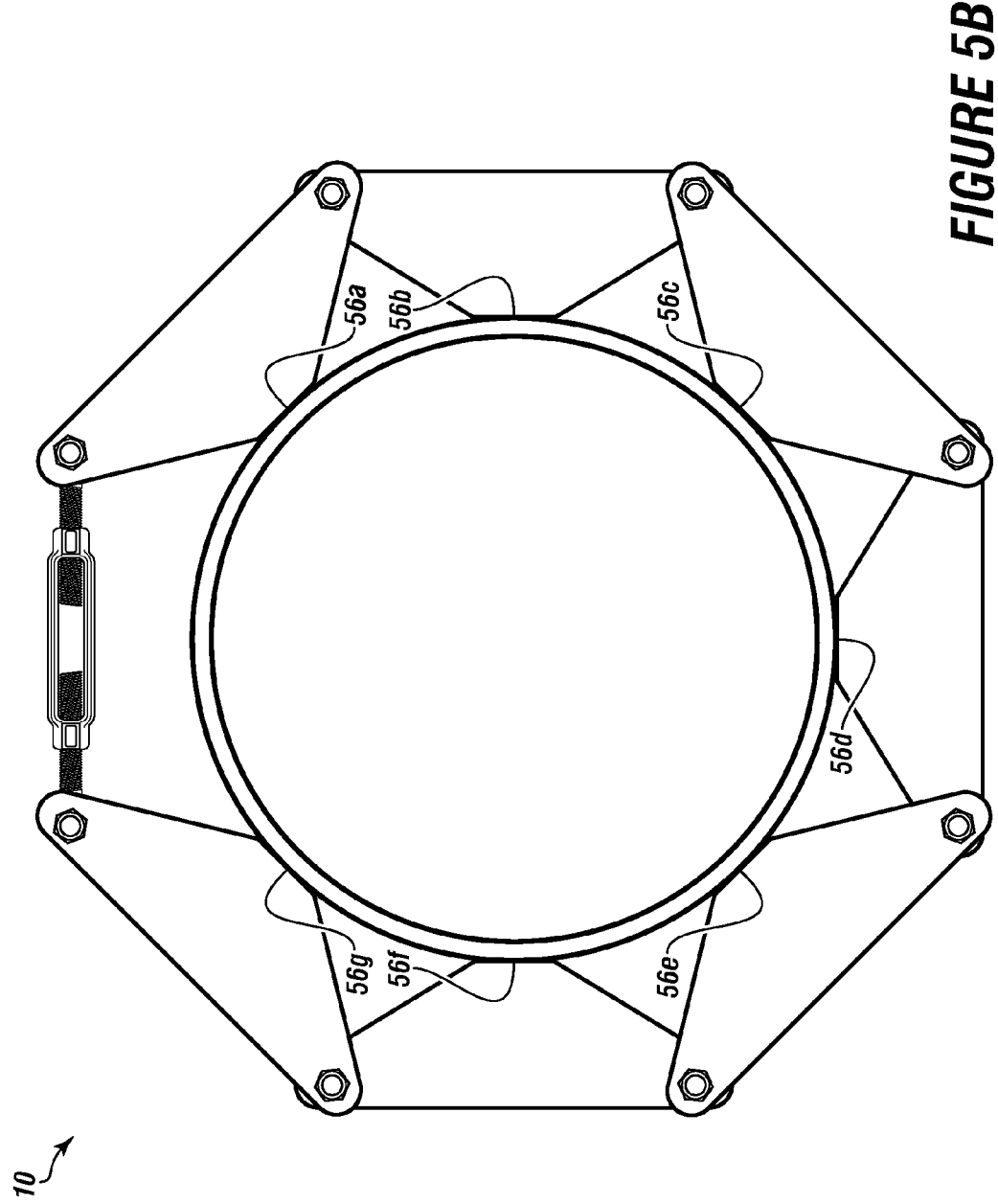

STANDOFF RING AND SAFETY CAGE FOR PROCESS PIPE

FIELD

The present embodiments generally relate to a standoff ring and safety cage for process pipe in chemical facilities or petrochemical plants.

BACKGROUND

A need exists for an easy to install versatile, lightweight standoff ring to protect workers in chemical plants and refineries.

A need exists for a rust proof standoff ring that can be modified in the field for different sizes of pipes while providing a secure fitting around the process pipe.

A need exists for a device that replaces insulation currently used around a process pipe, that allows the process pipe to release heat at a faster pace, while still providing a safety zone for workers.

The present embodiments meet these needs.

BRIEF DESCRIPTION OF THE DRAWINGS

The detailed description will be better understood in conjunction with the accompanying drawings as follows:

FIG. 2C depicts an exploded view of another embodiment of a pair of double plate ring plates connected by a masterlink.

FIG. 5B depicts another embodiment of the standoff ring with triangular single ring plates.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The embodiments relate to a standoff ring for surrounding to a process pipe or other processing equipment, such as a heat exchanger.

The standoff ring can have a plurality of single ring plates. Each single ring plate can have a plurality of single ring plate fastener holes, such as two.

The standoff ring can have a plurality of double plate ring plates. Each double plate ring plate can have a first plate and a second plate with a pair of double plate ring plate fastener holes for each plate.

To form the standoff ring, the single ring plates can connect between double plate ring plates, alternating with the double plate ring plates.

One of a plurality of fasteners can secure through aligned fastener holes in the plates, securing a single ring plate between a pair of first and second plates of the double plate ring plates. The fasteners can be removable fasteners.

The fasteners can fit into aligned fastener holes of the single ring plate and the double plate ring plate, connecting three plates together.

Each of the plurality of fasteners can engage at least three aligned fastener holes of the plates simultaneously.

A benefit of the standoff ring is that the pipe can be inspected 100 percent of the length of the pipe while providing a safety zone to an inspector. This access can be 24 hours a day, 7 days a week, which can help prevent explosions and fires in a facility when a failure occurs. The access also allows an inspector to view corrosion which can lead to toxic spills in a chemical plant due to leakage.

A benefit of the standoff ring is replacing regular insulation, preventing hidden failures which can lead to the death of workers adjacent the pipe when a failure occurs.

A benefit of the standoff ring is that it takes less time to install the standoff ring, keeping workers out of the field, at least 50 percent less than otherwise.

A benefit of the standoff ring is that it is versatile and easy to install in the field and adaptable to fit different diameter pipes without the need for additional welding.

A benefit of the standoff ring with safety cage is that the safety device is reusable. The standoff ring with cage can be removed from a process pipe of a first diameter and reinstalled on a process pipe of a second diameter without having to remachine any part of the standoff rings so long as the process pipe fits within the diameter of the encircling safety cage.

A benefit of this design of the standoff ring is that the standoff ring does not have waste material in the fabrication.

Figure 1:
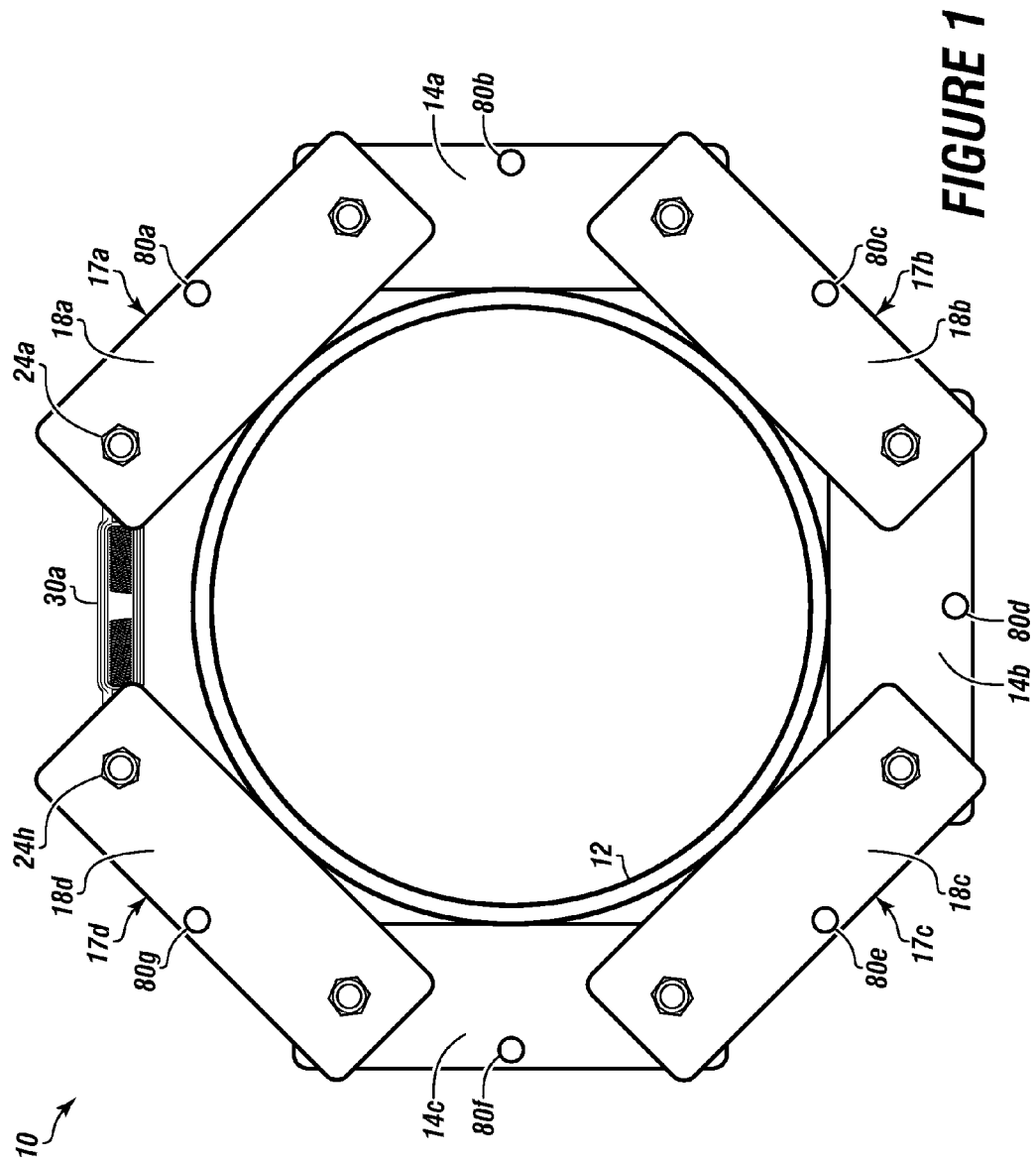
FIG. 1 depicts a top view of a standoff ring surrounding a process pipe from a pipe end view with a masterlink.

Turning now to the Figures, FIG. 1 depicts a top view of a standoff ring 10 surrounding a process pipe 12 from a pipe end view with a masterlink 30a.

The standoff ring 10 can have a plurality of single ring plates 14a-14c. The standoff ring can be adjustable.

Each single ring plate can have a pair of single ring plate fastener holes.

The standoff ring can have a plurality of double plate ring plates 17a-17d.

Each single ring plate can be mounted between a first plate and second plate of a double plate ring plate. First plates 18a-18d are shown.

In embodiments, the first plates and the second plates can be identical sizes.

Each first plate and second plate can have at least one pair of aligned plate fastener holes into which fasteners 24a-24h can be inserted.

In this embodiment, the single ring plates, first plates and second plates can all be an identical length, width and thickness.

In other embodiments, the single ring plates and the first and second plates can vary in thickness from $1/8^{th}$ of an inch to 2 inches.

In other embodiments, the single ring plates and the first and second plates can vary in length from 1 inch to 20 inches.

In other embodiments, the single ring plates and the first and second plates can vary in width from $1/2$ of an inch to 12 inches.

The fastener holes of the first and second plates and one of the single ring plates can align so that a single fastener can extend through all three plates simultaneously.

Each fastener can pass through the fastener holes of one single ring plate and one double plate ring plate simultaneously.

In embodiments, each plate can consist of 100 percent aluminum.

In other embodiments, the plates can be carbon steel, stainless steel, or an alloy of a similar structurallly sturdy metals capable of sustaining a temperature from 100 degrees Fahrenheit to 600 degrees Fahrenheit without deforming and without causing a static electricity discharge.

In embodiments, the plates can be solid other than the fastener holes.

The standoff ring can have aligned attaching holes $80a$-$80g$. Each plate of each double plate ring plate and each single ring plate can have one attaching hole.

For the double plate ring plate, the aligned attaching holes of the first and second plates can be aligned for anchoring or securing the safety cage to the standoff ring.

Figure 2A:
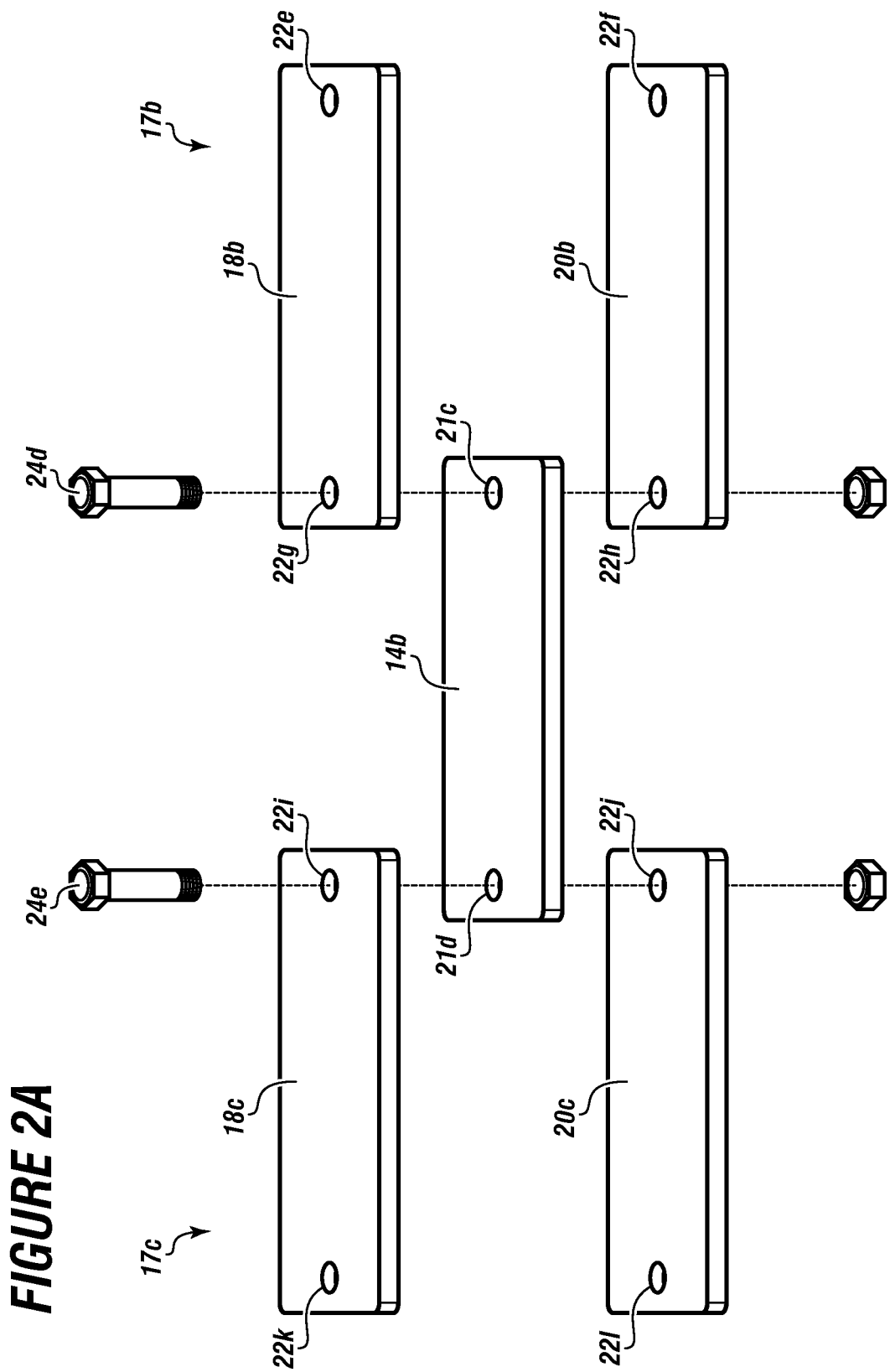
FIG. 2A depicts an exploded view of a double plate ring plate and a single ring plate as they connect together.

FIG. 2A depicts an exploded view of a double plate ring plate and a single ring plate as the plates connect together.

The single ring plate $14b$ can be rectangular in shape and can have a single ring plate fastener hole $21c$.

The single ring plate fastener hole $21c$ can be aligned with the fastener hole $22g$ of a first plate $18b$ of a double plate ring plate $17b$.

A fastener hole $22e$ of the first plate $18b$ can be aligned with a fastener hole $22f$ of a second plate $20b$ of the double plate ring plate $17b$.

The single ring plate fastener hole $21c$ can be aligned with a fastener hole $22h$ of the second plate $20b$ of the double plate ring plate $17b$.

A fastener $24d$ can extend through fastener hole $22g$ of the first plate $18b$, single ring plate fastener hole $21c$ of the single ring plate $14b$, and fastener hole $22h$ of the second plate $20b$ simultaneously.

The fasteners $24d$ and $24e$ can be fasteners such as pins, rivets or bolts with nuts.

The single ring plate $14b$ can have a single ring plate fastener hole $21d$.

The single ring plate fastener holes $21c$ and $21d$ can be formed on opposite ends of the single ring plate close to an edge of the single ring plate, such as within 3 inches of the edge of the single ring plate.

The single ring plate fastener hole $21d$ can be aligned with the fastener hole $22i$ of a first plate $18c$ of a double plate ring plate $17c$.

The fastener hole $22i$ can be aligned with a fastener hole $22j$ of a second plate $20c$ of the double plate ring plate $17c$.

The fastener hole $22k$ of the first plate $18c$ can be aligned with a fastener hole $22l$ of the second plate $20c$.

A fastener $24e$ can extend through fastener hole $22i$ of the first plate $18c$, single ring plate fastener hole $21d$ of the single ring plate $14b$, and fastener hole $22j$ of the second plate $20c$ simultaneously.

The fastener holes and single ring plate fastener holes can have a diameter from ¼ inch to 2 inches. In an embodiment, the fastener holes and single ring plate fastener holes can be threaded.

Figure 2B:
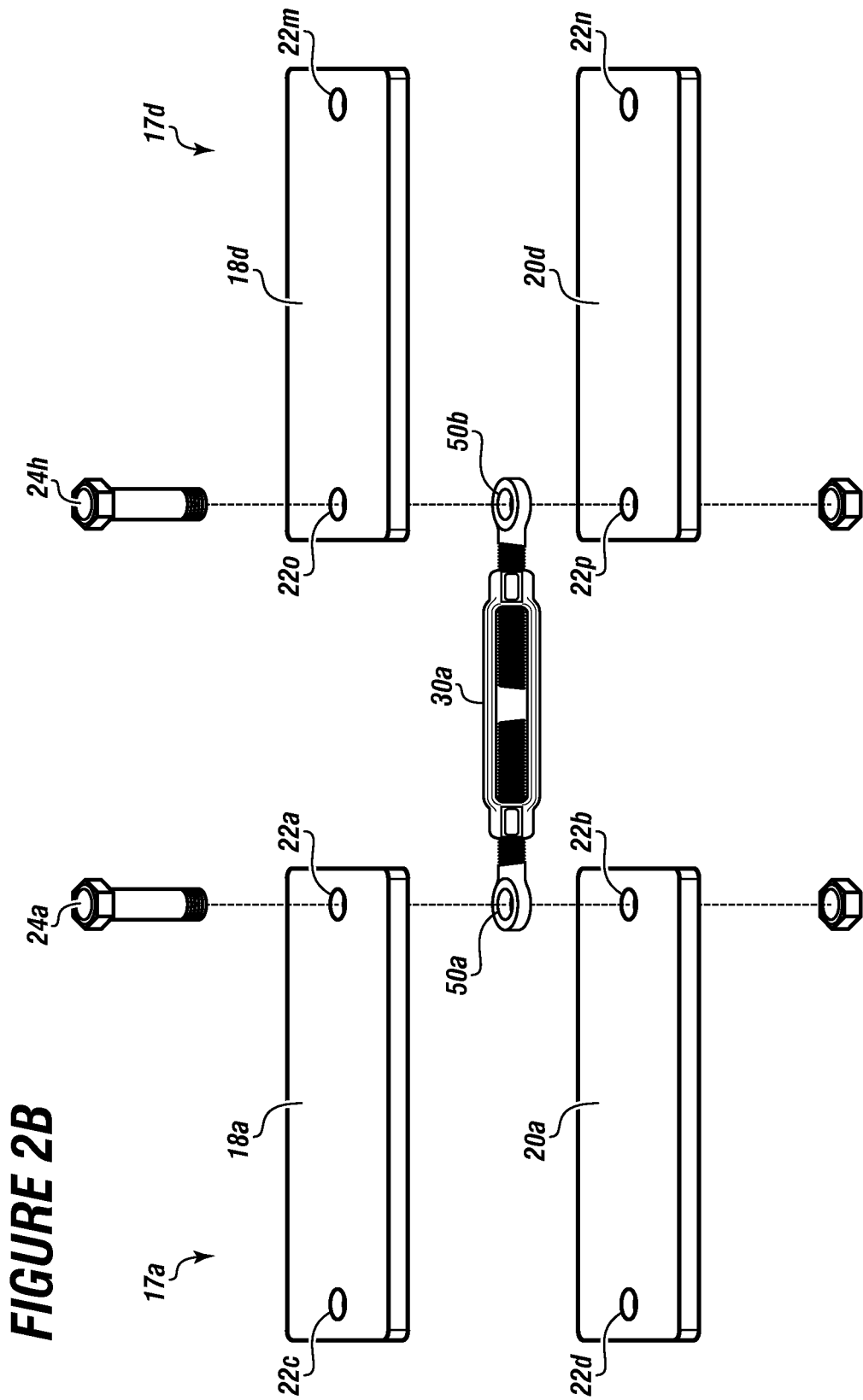
FIG. 2B depicts and exploded view of an embodiment of a pair of double plate ring plates connected by a masterlink.

FIG. 2B depicts an embodiment of a pair of double plate ring plates $17a$ and $17d$ connected by a masterlink $30a$.

The double plate ring plate $17a$ can have a first plate $18a$ and a second plate $20a$. A masterlink $30a$, shown as a turnbuckle, can be mounted between the first plate $18a$ and second plate $20a$ forming an assembly resembling a sandwich.

The double plate ring plate $17d$ can have a first plate $18d$ and a second plate $20d$. An opposite end of the masterlink $30a$ can be mounted between the first plate $18d$ and second plate $20d$ forming a second assembly resembling a sandwich.

In this embodiment, the first plates and the second plates can be identical sizes and identical shapes.

The first plates and second plates can be rectangular, oval, elliptical, triangular, or square in shape.

A fastener $24a$ can penetrate through a fastener hole $22a$ on the first plate, through an alignment hole $50a$ in one end of the masterlink, and through a fastener hole $22b$ on the second plate simultaneously.

A fastener $24h$ can penetrate through a fastener hole $22o$ on the first plate, through an alignment hole $50b$ in one end of the masterlink, and through a fastener hole $22p$ on the second plate simultaneously.

The opposite end of the pair of holes on the first plates and second plates can align, that is fastener hole $22m$ of first plate $18d$ can align with fastener hole $22n$ of second plate $20d$.

Similarly, the fastener hole $22c$ on the first plate $18a$ can align with fastener hole $22d$ of second plate $20a$.

In this embodiment, the fasteners $24a$ and $24h$ can be fasteners such as pins, rivets or bolts with nuts.

In embodiments, the fasteners can be one of a plurality of types of fasteners, such as a nut and bolt assembly or a removable pin with detent or a bolt.

FIG. 2C shows another embodiment of a pair of double plate ring plates $17a$ and $17d$ connected by a masterlink $30b$.

In this embodiment, the masterlink $30b$ can be a single ring plate with a plurality of alignment holes $60a$-$60i$.

The alignment holes can align with fastener holes of the adjacent first and second plates allowing for adjustment of size of the standoff ring. Using a fastener to connect through the two fastener holes and one of the alignment holes enable a user in the field to easily increase or reduce the inner diameter of the standoff ring around a process pipe.

The masterlink $30b$ can be sandwiched between first plate $18a$ with fastener holes $22a$ and $22c$ and second plate $20a$ with fastener holes $22b$ and $22d$ using alignment hole $60a$. The masterlink $30b$ can simultaneously be sandwiched between first plate $18d$ and second plate $20d$, wherein first plate $18d$ has fastener holes $22o$ and $22m$ and second plate $20d$ has fastener holes $22p$ and $22n$.

Fasteners $24a$ and $24h$ can each be used to align two fastener holes and an alignment hole simultaneously.

Figure 3:
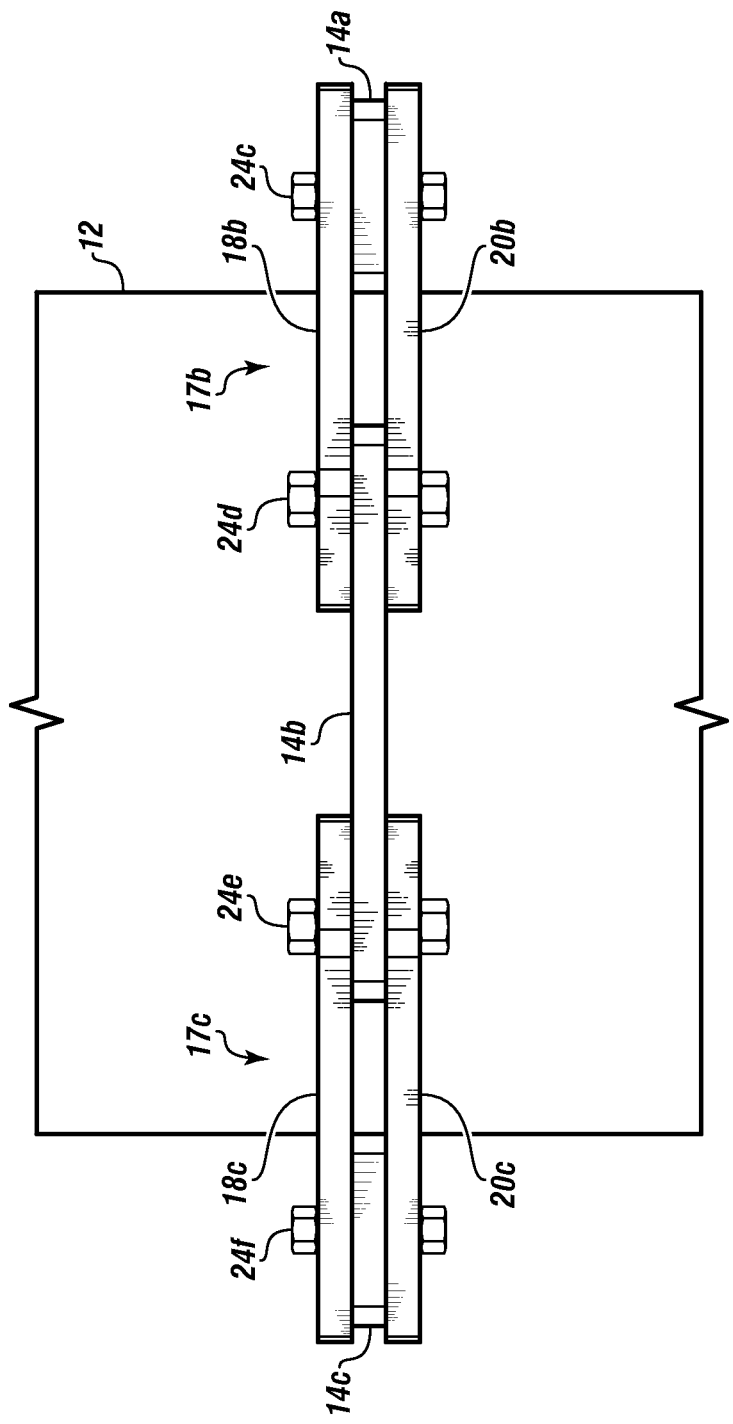
FIG. 3 depicts a side view of an embodiment of the standoff ring.

FIG. 3 shows a side view of an embodiment of the standoff ring.

The standoff ring can encircle a process pipe $12$.

A single ring plate $14b$ is shown between double plate ring plates $17c$ and $17b$.

Double plate ring plate $17b$ can have a first plate $18b$ and a second plate $20b$ and can hold one side of the single ring plate $14b$ using fastener $24d$.

Single ring plate $14a$ can be connected to double plate ring plate $17b$ between first plate $18b$ and a second plate $20b$ and using fastener $24c$.

Double plate ring plate $17c$ can have a first plate $18c$ and a second plate $20c$ and can hold an opposite side of the single ring plate $14b$ using fastener $24e$.

Single ring plate $14c$ can be connected to double plate ring plate $17c$ between first plate $18c$ and a second plate $20c$ and using fastener $24f$.

Each fastener can be long enough to both extend through and connect the first plate with the second plate while sandwiching a single ring plate between the first plate and second plate, extending through the fastener holes and single ring plate fastener holes.

In embodiments, the single ring plates can have identical lengths.

In embodiments, the double plate ring plates can have identical lengths but the single ring plate lengths can be different lengths than the lengths of the double plate ring plates.

In embodiments, the double plate ring plates can have a length that can be 1 percent to 20 percent longer, 1 percent to 20 percent wider and 1 percent to 20 percent thicker than the single ring plates.

Figure 4:
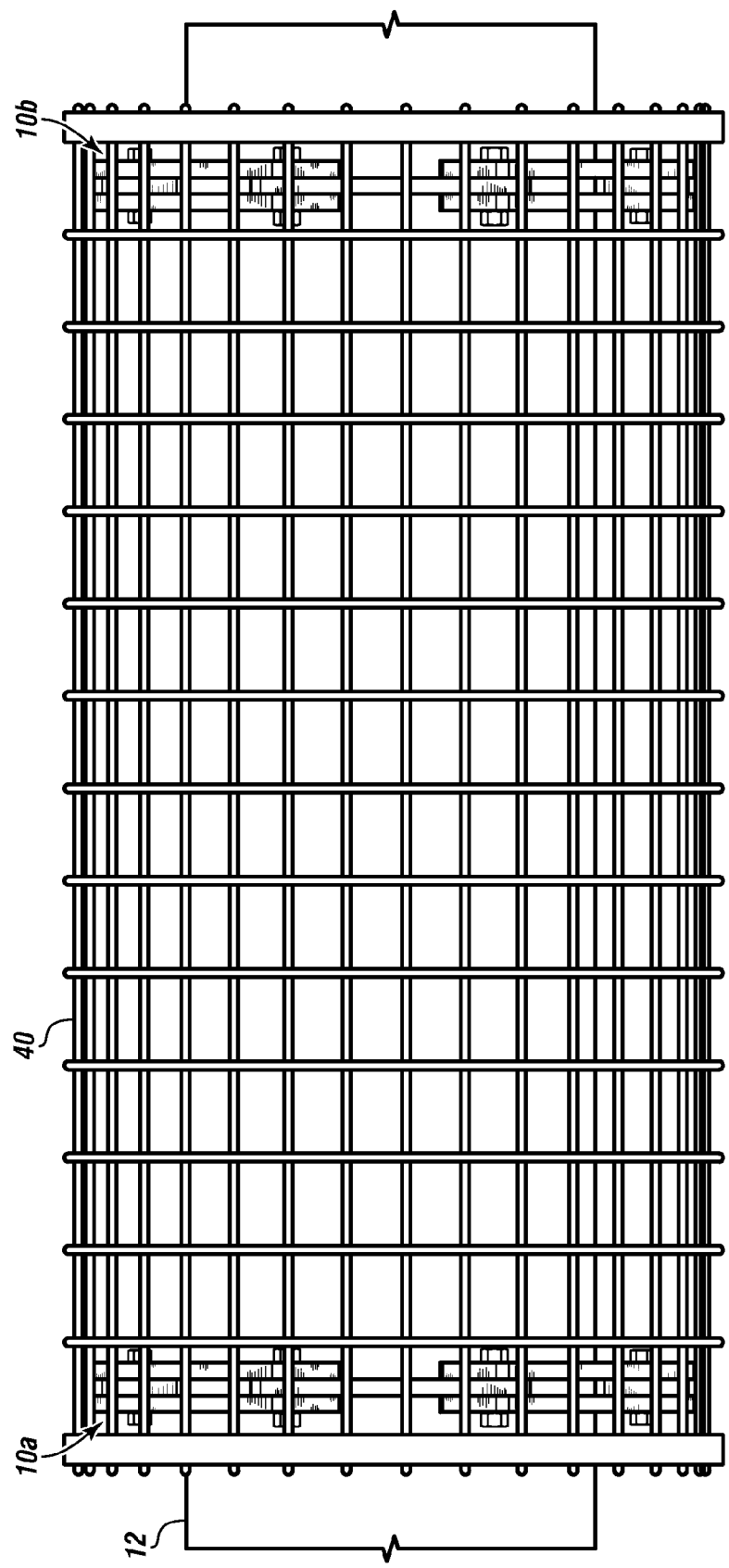
FIG. 4 depicts two standoff rings around a process pipe with a safety cage connected between the two standoff rings.

FIG. 4 depicts a process pipe encircled by a safety cage.

A first standoff ring 10a can be connected to a safety cage 40 that encircles the process pipe 12 providing a safety zone between users proximate the process pipe.

In embodiments, the process pipe 12 can be a heat exchanger.

In embodiments, the safety cage can have a second standoff ring 10b connected to an opposite end of the safety cage encircling the process pipe from the first standoff ring.

Figure 5A:
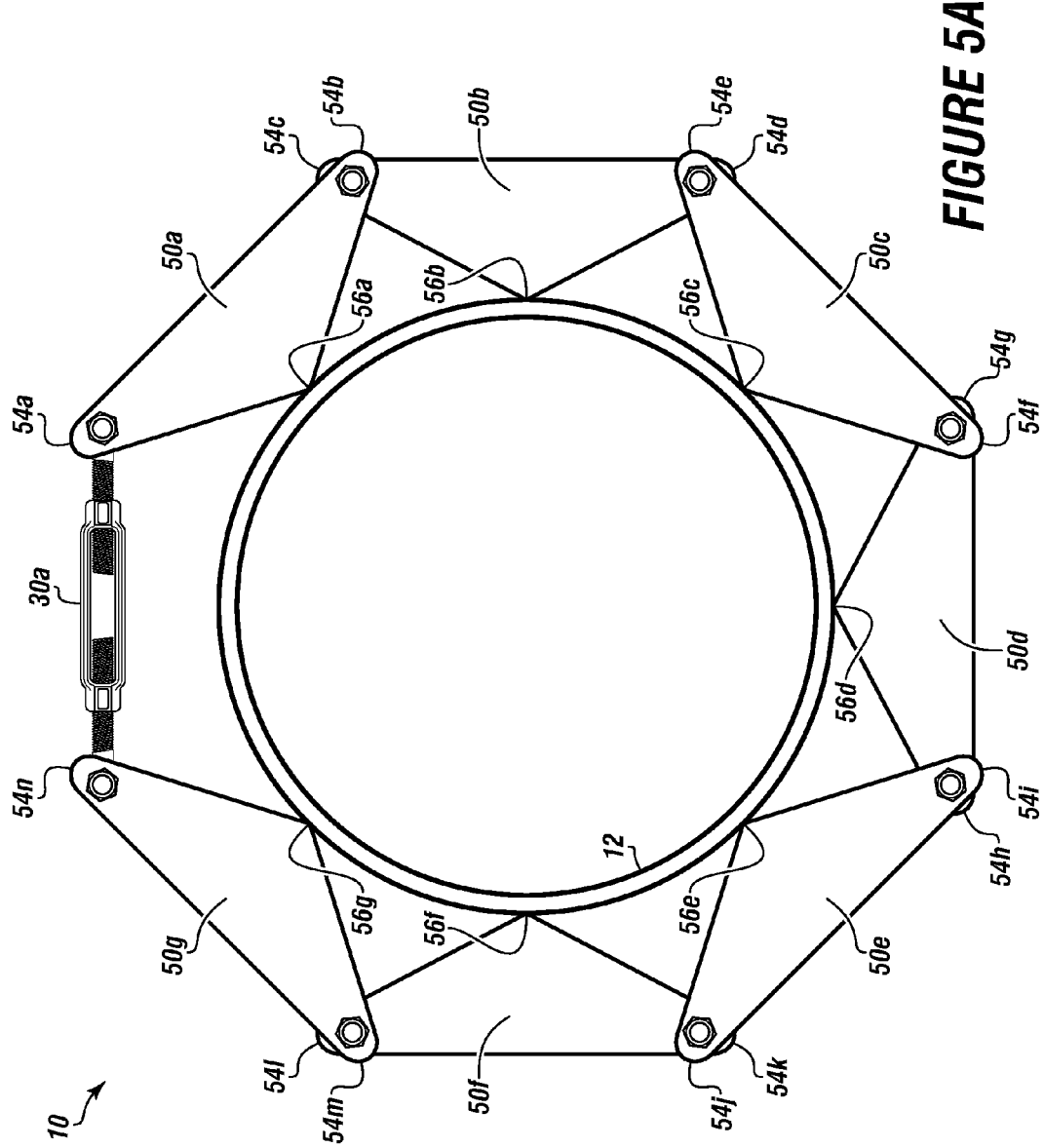
FIG. 5A depicts an embodiment of the standoff ring with triangular single ring plates.

FIG. 5A depicts an embodiment of the standoff ring with triangular single ring plates.

In this embodiment, the standoff ring 10 for temperature transfer to a process pipe can have a plurality of triangular single ring plates 50a-50g. Each triangular single ring plate can have a pair of opposing single ring plate fastener holes.

The triangular single ring plates 50a-50g can each have a pair of connecting points 54a-54n and a contact point 56a-56g.

Each contact point can engage the process pipe 12.

In this embodiment, the triangular single ring plates can each have identical sizes.

An adjustable masterlink 30a can be fastened between a pair of triangular single ring plates 50a and 50g.

A plurality of fasteners can be used for connecting each triangular single ring plate to at least one other triangular ring plate and/or to the masterlink. One fastener can be used for connecting a triangular single ring plate to an adjacent triangular single ring plate.

Each single ring plate fastener hole of each triangular single ring plate can be aligned with a single ring plate fastener hole of an adjacent triangular single ring plate or with an alignment hole of the masterlink.

FIG. 5B depicts another embodiment of the standoff ring with triangular single ring plates.

In this embodiment of the standoff ring 10, the contact points 56a-56g of each triangular single ring plate can each have a blunt end.

Figure 6:
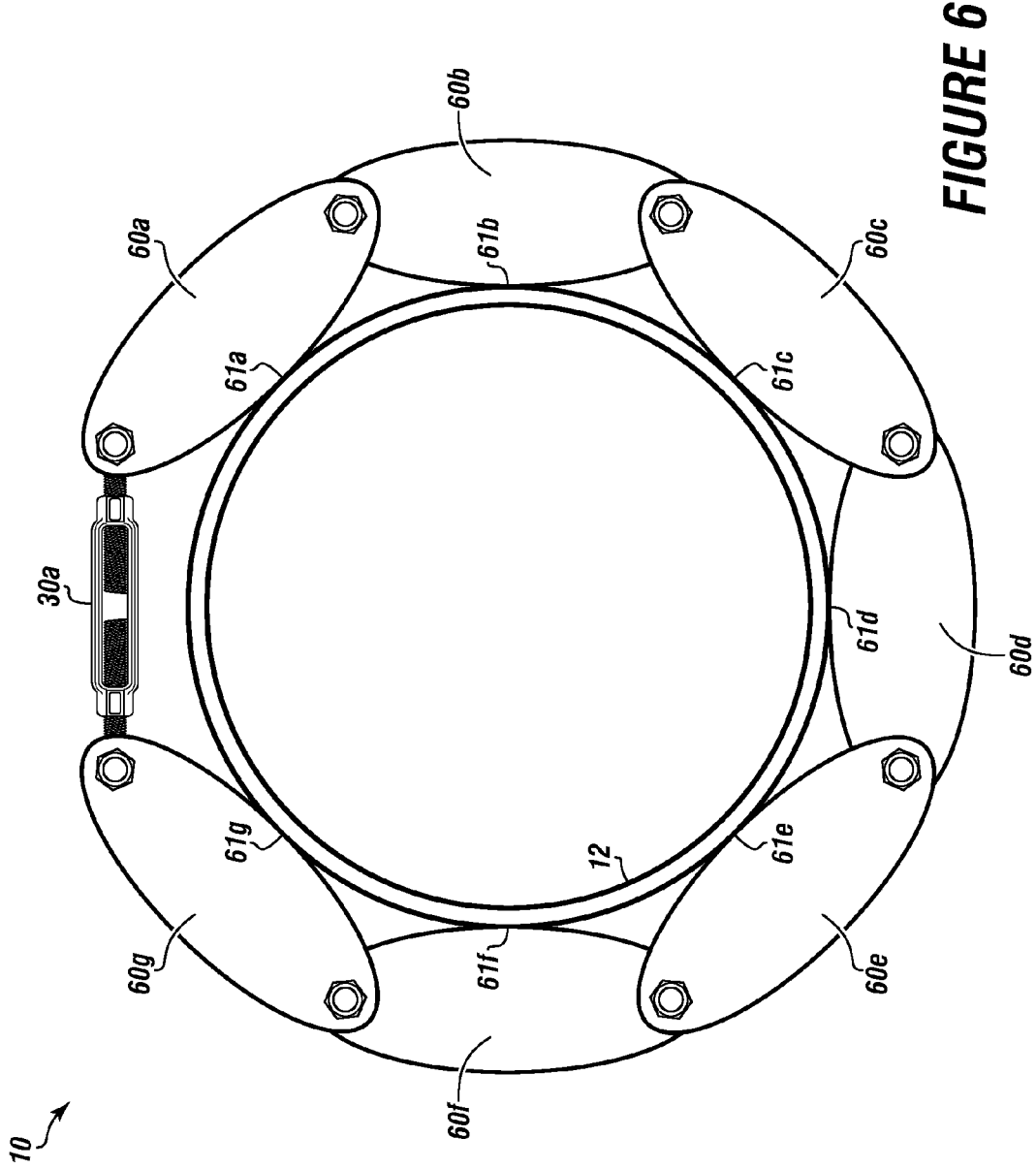
FIG. 6 depicts an embodiment of a standoff ring with elliptical single ring plates.

FIG. 6 depicts an embodiment of a standoff ring for temperature transfer to a process pipe having a plurality of elliptical single ring plates.

The standoff ring 10 can have a plurality of elliptical single ring plates 60a-60g.

Each elliptical single ring plate can have a pair of opposing single ring plate fastener holes.

Each elliptical single ring plate can have a contact side 61a-61g for engaging a process pipe 12.

In embodiments, the elliptical single ring plates can each have identical sizes. In other embodiments, the elliptical single ring plates can vary in size.

An adjustable masterlink 30a can be fastened between a pair of elliptical single ring plates.

Fasteners be used to connect through each single plate fastener hole of each elliptical single ring plate to a single plate fastener hole of an adjacent elliptical single ring plate or through an alignment hole of the masterlink.

The single plate fastener holes of each of the elliptical single ring plates can be aligned.

While these embodiments have been described with emphasis on the embodiments, it should be understood that within the scope of the appended claims, the embodiments might be practiced other than as specifically described herein.

What is claimed is:

1. A standoff ring for temperature transfer to a process pipe, the standoff ring comprising:
   a. a plurality of single ring plates, each single ring plate having a plurality of single ring plate fastener holes;
   b. a plurality of double plate ring plates, each double plate ring plate having a first plate and a second plate, the first plate and the second plate having identical sizes and each first plate and second plate having a pair of aligned fastener holes, the single ring plates alternating with the double plate ring plates to form the standoff ring;
   c. at least one adjustable masterlink fastened between a pair of aligned double plate ring plates, wherein the adjustable masterlink comprises a plurality of alignment features allowing for adjustment of a size of the standoff ring, and further wherein each alignment feature comprises an alignment hole;
   d. a plurality of fasteners for fastening into the fastener holes, wherein each single ring plate connects between the first plate and the second plate of the double plate ring plates, the fastener holes of the three plates are aligned, and one of the plurality of fasteners engages the aligned fastener holes of the three plates simultaneously; and wherein each alignment feature mechanically interacts with a double plate ring plate of the plurality of double plate ring plates, mechanically interacts with a single ring plate of the plurality of single ring plates, or mechanically interacts with a fastener of the plurality of fasteners, further wherein each double plate ring plate of the plurality of double plate ring plates and each single ring plate of the plurality of single ring plates have a substantially identical shape.

2. The standoff ring of claim 1, wherein the at least one adjustable masterlink is a turnbuckle.

3. The standoff ring of claim 1, wherein each plate is solid 100 percent aluminum excluding the fastener holes.

4. The standoff ring of claim 1, wherein the fastener holes have a diameter from ¼ of an inch to 2 inches.

5. The standoff ring of claim 1, wherein the identical shape is selected from the group: rectangular, elliptical, triangular, or square.

6. The standoff ring of claim 1, wherein the plurality of single ring plates have a different length than the plurality of double plate ring plates.

7. The standoff ring of claim 1, wherein the plurality of single ring plates and the plurality of double plate ring plates have identical sizes.

8. The standoff ring of claim 1, wherein each of the plurality of fasteners is: a pin, a nut and bolt assembly, a removable pin with detent, a rivet, or combinations thereof.

9. The standoff ring of claim 1, further comprising a safety cage connecting to and extending from the standoff ring, wherein the safety cage encircles the process pipe providing a safety zone between users proximate the process pipe.

10. The standoff ring of claim 9, further comprising an aligned attaching hole for each double plate ring plate and each single ring plate, wherein the aligned attaching hole penetrates both plates of each double plate ring plate for securing the safety cage to the standoff ring.

11. A standoff ring for temperature transfer to a process pipe, the standoff ring comprising:
   a. a plurality of single ring plates, each single ring plate having a pair of opposing single ring plate fastener holes, each single ring plate having a contact point for engaging a process pipe, the single ring plates each having identical sizes;

b. an adjustable masterlink fastened between a pair of single ring plates, wherein the adjustable masterlink comprises a plurality of alignment features allowing for adjustment of a size of the standoff ring, and further wherein each alignment feature comprises an alignment hole;

c. a plurality of fasteners for connecting pairs of single ring plates together, wherein each fastener of the plurality of fasteners engages at least two single ring plate fastener holes; and wherein each alignment feature mechanically interacts with a single ring plate of the plurality of single ring plates or mechanically interacts with a fastener of the plurality of fasteners, further wherein each single ring plate of the plurality of single ring plates is triangular or elliptical.

12. The standoff ring of claim 11, wherein each contact point has a blunt end.

13. The standoff ring of claim 11, further comprising a safety cage connecting to and extending from the standoff ring, wherein the safety cage encircles the process pipe providing a safety zone between users proximate the process pipe.

* * * * *